United States Patent [19]

Niwiera et al.

[11] 4,413,768
[45] Nov. 8, 1983

[54] METHOD OF MAKING A MULTI-BORE ELEMENT

[75] Inventors: Wolfgang Niwiera; Franz-Josef Holtorf; Hans H. Biederer, all of Osnabrück, Fed. Rep. of Germany

[73] Assignee: Kabel-und Metallwerke, Guthehoffnungshütte AG, Hanover, Fed. Rep. of Germany

[21] Appl. No.: 325,745

[22] Filed: Nov. 30, 1981

[30] Foreign Application Priority Data

Oct. 29, 1981 [DE] Fed. Rep. of Germany ....... 3110434

[51] Int. Cl.³ .............................................. B23K 31/02
[52] U.S. Cl. ................................ 228/173 A; 228/183; 138/89; 219/85 M; 29/157.4
[58] Field of Search ................... 228/173 A, 120, 168, 228/174, 175, 131, 183, 60, 173 F, 173 E; 29/157.4, 157.6, 157.3 R; 165/168; 148/127; 138/80, 91; 219/85 M, 117.1, 118

[56] References Cited

U.S. PATENT DOCUMENTS

| | | | |
|---|---|---|---|
| 2,110,965 | 3/1938 | Singen | 72/343 |
| 3,025,596 | 3/1962 | Ward et al. | 228/131 |
| 3,157,539 | 11/1964 | Preher | 148/127 |
| 3,347,079 | 10/1967 | Rowell et al. | |
| 3,900,939 | 8/1975 | Greacen | 29/157.4 |
| 4,200,217 | 4/1980 | Imai et al. | 228/173 A |

FOREIGN PATENT DOCUMENTS 1099850 1/1968 United Kingdom .

Primary Examiner—Kenneth J. Ramsey
Assistant Examiner—M. Jordan
Attorney, Agent, or Firm—Ralf H. Siegemund

[57] ABSTRACT

A copper blank is provided with bores, and copper plugs are used to obtain blind bores. The plugs are connected to the blank in a variety of ways and are either placed centrally or at the bore ends; in the latter case, two such elements are interconnected back-to-back, possibly under inclusion of a solid center. In the former case, the plugs are soldered or brazed, preferably during annealing. In either case, a hollow drawing for sizing completes to process.

11 Claims, 5 Drawing Figures

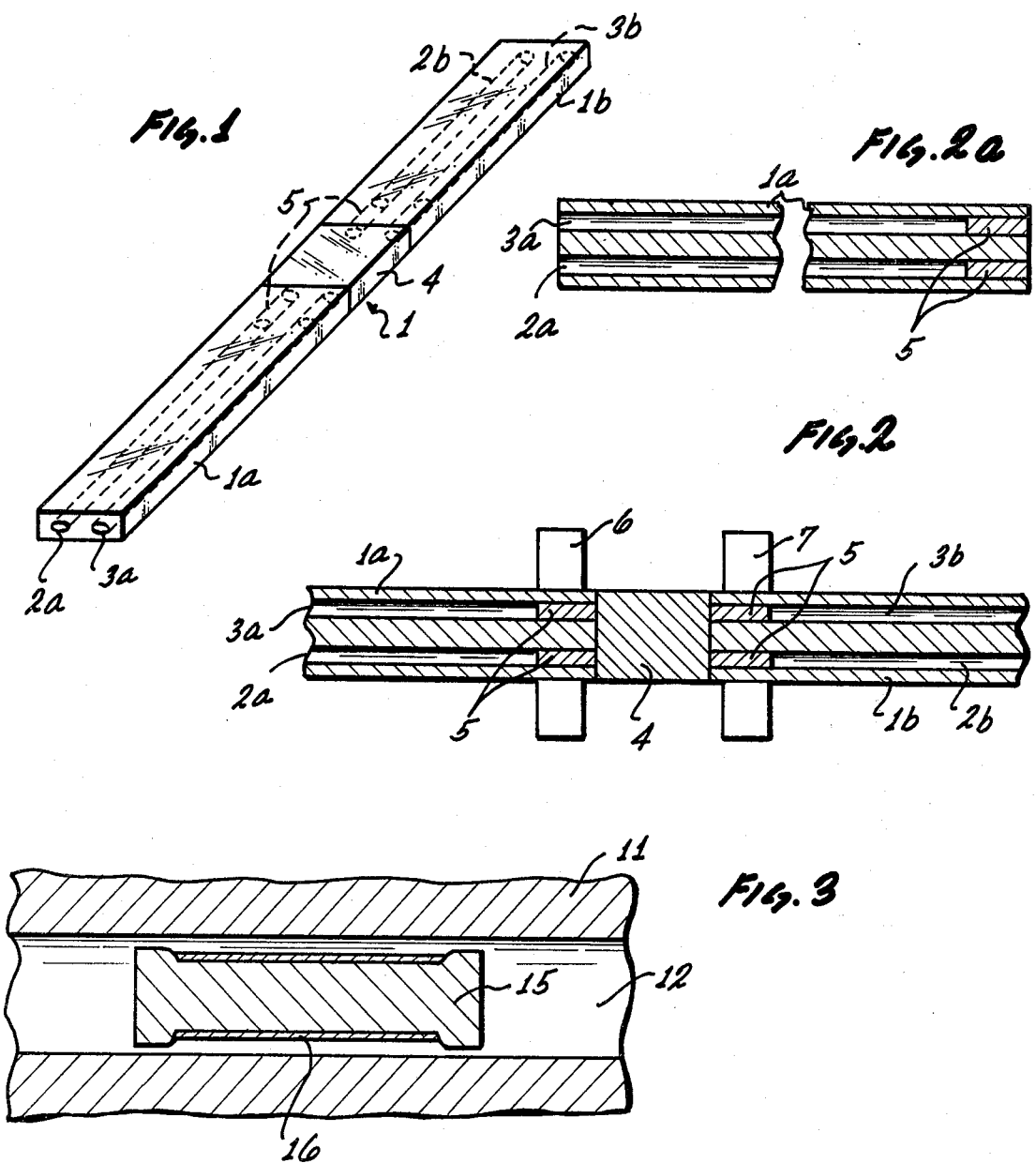

METHOD OF MAKING A MULTI-BORE ELEMENT

BACKGROUND OF THE INVENTION

The present invention relates to the making of copper or copper alloy hollows to be used, for instance, for heat exchange purposes (e.g., cooling) in generators.

A known method proceeds by press-working a copper blank or billet over a mandrel tool in order to obtain a hollow blank which is subsequently drawn to the desired final dimensions. British Pat. No. 1 099 850, for instance, proposes such a method in that particularly a copper billet is extruded to obtain a hollow with a rectangular cross section and at least two longitudinal channels or bores. The known method is not directly suitable for making sections or profiles with interrupted channels, ducts or bores.

DESCRIPTION OF THE INVENTION

It is an object of the present invention to improve the making of multi-blind-bore copper or copper alloy sections.

It is a feature of the present invention to provide multibore sections of copper on a copper alloy by means of cold-working a solid blank or a mandrel (e.g., extrusion-piercing) and by using plugs in a tight-fitting configuration. In one form, two such sections are prepared, and one end of each bore is tightly plugged. The plugged ends are then interconnected by welding, either directly or by interposing a solid piece. The resulting product is subsequently hollow-drawn for purposes of sizing. Alternatively, the sized section is provided with such plugs which are, however, placed centrally and provided with a solder or brazing filler. The section, including the plugs, is drawn and subsequently heated to complete soldering of the plugs to the respective inside walls of the bores. Thereafter, the bores are sized by hollow drawing. This last version is particularly advantageous from the point of view of sealing the resulting blind bores from each other. In the first version, one relies on a tight fit by either drawing the section down so that the bores assume diameters matching the respective diameter of the plug; or the plugs are just pressed into the bores in a tight fit. It is essential in this case that the plugged end faces have equal areas; a center piece, if interposed, must have matching surfaces so that a piece with a uniform outer surface results. Subsequent annealing may obliterate the welding surfaces and render the piece an integral one. This then is followed by hollow drawing for sizing the bores. In either case and version, annealing (spheroidizing) prior to hollow drawing for sizing is desirable. The heat application for annealing may be utilized in the one version in order to obtain soldering. Brazing may be used in lieu of soldering.

The plugs each should be constructed to retain the solder flux or filler when heated. For this, end shoulders of a slightly larger diameter are provided. The solder or filler may be placed on the plugs, in between their respective shoulders. Alternatively, small, lateral bores in the section may be provided for filling in liquid solder flux.

The invention arose in the art of electrical generators wherein electrical conductors, particularly rotating copper elements, have to be cooled; the sections are, therefore, made to have a quadrilateral (rectangular) section profile, and provide for balancing any rotation.

The material to be used is copper or a copper alloy, and the plugs are made of the same material.

DESCRIPTION OF THE DRAWINGS

FIG. 1 is a perspective view of a section made in accordance with a preferred embodiment of the invention;

FIGS. 2a and 2b are section views through the items of the section as per FIG. 1 during various stages of its making;

FIG. 3 is a section view through an alternative example for practicing the invention in accordance with the best mode thereof; and FIG. 4 is a section view showing a modification of the arrangement of FIG. 3.

Proceeding now to the detailed description of the drawings, FIG. 1 illustrates a multi-blind-bore section 1 made in accordance with the present invention. The section is made of copper that is free of oxygen, and it is provided with four bores or ducts (2a, 2b, and 3a, 3b) which are aligned in pairs, each pair, however, being a blind bore. The section includes a solid central part 4, and copper plugs 5 are disposed adjacent to this center 4, at the end of each of the bores.

This section is made as follows: by means of extrusion or similar press working, followed by cold-drawing, a solid blank is, in effect, worked into a multibore hollow using mandrels of the variety held by a chain or a rod in the requisite position during working, to provide section pieces 1a and 1b, having ducts 2a, 3a and 2b, 3b respectively. Closely fitting copper plugs 5 are then inserted in one end of these bores; see FIG. 2a for section 1a. Next, the pieces 1a, 1b are drawn down so that the bore walls fit tightly around the plugs. The plugs 5 determine the interior sizes of the bores, and drawing is carried out only in order to reduce the bore diameters to that size. Alternatively, the bores may already have that final size, and the plugs 5 are merely driven into the bores in which they just fit, without play.

Next, the one end of each of the pieces 1a and 1b having these plugs are cut slightly or just polished in order to obtain a true, planar end surface. Any burr is removed; and now, these two section pieces are placed in abutment with a solid piece 4 of like cross sectional dimensions.

FIG. 2b illustrates that the two sections are electrically welded to opposite end faces of center piece 4. For this, welding electrodes 6 and 7 are clamped to the pieces 1a and 1b, and a welding current flows through the interfaces with solid section 4. A current of several kilo amperes heats the material at the interfaces to the melting point, and the clamps 6 and 7 force the pieces 1a and 1b toward center piece 4. Thereafter, the welding clamps 6 and 7 are removed, and any burr is also removed. The resulting one-piece product is preferably recrystallization-annealed to obliterate the welding seam and transform the three-section piece into an integral on as far as internal texture and structure is concerned. Finally, a hollow drawing step reduces the outer diameter by approximately 10% and sizes the blind bores. This cold-drawing process imparts also the requisite strength upon the copper part.

FIGS. 3 and 4 illustrate a different approach. The initial steps are the same, a section 11 with two or more bores or ducts is made as described, just one duct 12 being shown in the drawing. These ducts, however, are clearly of a larger diameter for permitting easy insertion of a plug 15 and placing it into a central position. Plug 15 has a stem portion of reduced diameter and carries a solder or brazing filler foil 16. The foil may additionally be fastened by spot welding or the like; i.e., local heating causes it to adhere to the carrying plug 15 so that the foil cannot slip off as the plug is pushed into the bore.

Next, the profile 11 is drawn so that the diameter of the bores is reduced to the diameters of the calibration end shoulders of the plug, or all parts are reduced in size by means of drawing. Thereafter, the entire device is spheroidized; the heat being sufficient to cause the foil to melt so that, now, the plug 5 is soldered or brazed to the section 11. Spheroidizing is an annealing process that may be applied to the section in the case a rather hard or semihard product is desired. Finally, the section piece 11 is sized by (hollow drawing) means of a die and mandrels are inserted in the bores from opposite sides.

FIG. 4 illustrates an alternate version. The central portion of a plug 25 is provided with annular serrations or grooves 26, receiving solder material 27 which is coated or otherwise deposited thereon. The end shoulders 28 of the plug prevent the solder from engaging and sliding on the wall surface of bore 12. In this case, there is a definite need for drawing the piece 11 down in order to cause the wall of bore 12 to engage the plug 25 after the plug has been properly positioned. The end shoulders 28 will seal the solder area, preventing any solder flux from flowing out from the plug into the adjacent bore portions. Drawing the piece 11 down, of course, reduces the flow space for the solder. The solder process proper will also be carried out when the assembly is spheroidized. Alternatively, a torch may be applied from the outside. Sizing by hollow drawing follows as described.

The solder and flux or brazing filler can, in the alternative, be applied through small, lateral bores; it must be applied then in the liquid state and will lodge in the space between stem, shoulders, and wall of the respective bore to be plugged. The solder itself will later on plug the lateral bore through which it is fed.

As stated, the resulting product is used, for instance, in electric generators, particularly rotating parts thereof. The solid section (FIG. 1) and/or the plugs (FIGS. 1 to 4) serve also as balancing elements and are placed accordingly. They thus contribute to a true rotation.

The invention is not limited to the embodiments described above; but all changes and modifications thereof, not constituting departures from the spirit and scope of the invention, are intended to be included.

We claim:

1. A method of making a copper or copper alloy section having a plurality of blind bores, comprising the steps of
   providing two solid blanks;
   piercing each blank to obtain therein a plurality of through-bores;
   plugging one end of each bore by means of a tight-fitting plug;
   resistance-welding the plug ends of the two blanks directly to each other or to a solid blank; and
   sizing the bores to the extent that they are not plugged.

2. A method of making a copper or copper alloy section having a plurality of blind bores, comprising the steps of
   providing a solid blank;
   piercing the blank to obtain a plurality of through-bores;
   inserting a plug into the interior of each bore;
   providing each plug with a layer of solder or brazing material;
   drawing the section with inserted plugs to a smaller cross sectional size; and
   heating the section to soften the solder or brazing material so as to solder the plugs to the section.

3. A method as in claim 1 or 2, including annealing the blank or blanks after insertion of the plugs.

4. A method as in claim 3, the annealing serving as the heating step for soldering or brazing.

5. A method as in claim 3, and including the step of hollow-drawing the bores for sizing after the annealing.

6. A method as in claim 1, including the step of re-crystallization-annealing the section prior to sizing.

7. A method as in claim 2, including the step of spheroidizing the section prior to sizing.

8. A method as in claim 1, wherein the plugs are made to fit into the section in a tight fit by drawing the section after insertion of the plugs.

9. A method as in claim 1, including cutting and/or polishing the end surface of the blanks after insertion of the plugs.

10. A method as in claim 2, including the step of placing solder or brazing material onto the plugs prior to insertion.

11. A method as in claim 2 and laterally introducing solder or brazing material into the bores after insertion of the plugs.

* * * * *